United States Patent
Jang et al.

(10) Patent No.: US 12,299,999 B2
(45) Date of Patent: May 13, 2025

(54) IMAGE PROCESSING METHOD AND DEVICE FOR PROVIDING IMAGE FOR ARTIFICIAL INTELLIGENCE AND INFORMATION PROVISION SYSTEM FOR ARTIFICIAL INTELLIGENCE VEHICLE

(71) Applicant: Jong Hwan Jang, Gyeonggi-do (KR)

(72) Inventors: Jong Hwan Jang, Gyeonggi-do (KR); Eun Mi Kang, Gyeonggi-do (KR)

(73) Assignee: Jong Hwan Jang, Gyeonggi-do (KR)

( * ) Notice: Subject to any disclaimer, the term of this patent is extended or adjusted under 35 U.S.C. 154(b) by 421 days.

(21) Appl. No.: 17/918,943

(22) PCT Filed: Apr. 13, 2021

(86) PCT No.: PCT/KR2021/004605
§ 371 (c)(1),
(2) Date: Oct. 14, 2022

(87) PCT Pub. No.: WO2021/210874
PCT Pub. Date: Oct. 21, 2021

(65) Prior Publication Data
US 2023/0237808 A1 Jul. 27, 2023

(30) Foreign Application Priority Data
Apr. 16, 2020 (KR) ........................ 10-2020-0046060

(51) Int. Cl.
*G06V 20/58* (2022.01)
*G06V 10/764* (2022.01)
(Continued)

(52) U.S. Cl.
CPC ............ *G06V 20/58* (2022.01); *G06V 10/764* (2022.01); *G08G 1/16* (2013.01); *H04N 7/183* (2013.01);
(Continued)

(58) Field of Classification Search
USPC .......................................................... 382/104
See application file for complete search history.

(56) References Cited

FOREIGN PATENT DOCUMENTS

KR 10-2009-0060978 A 6/2009
KR 10-2010-0122386 A 11/2010
(Continued)

OTHER PUBLICATIONS

Fujitsu—Mar. 5, 2020, Fujitsu Laboratories LTD, Fujitsu Streamlines AI Video Recognition with High-Quality Compression Technology. Mar. 5, 2020. (Year: 2020).*
(Continued)

*Primary Examiner* — Jacky X Zheng
(74) *Attorney, Agent, or Firm* — Harness, Dickey & Pierce, P.L.C.

(57) ABSTRACT

The present disclosure provides an image processing device capable of outputting both an image for humans and an image for artificial intelligence, comprising: a display; a memory for storing at least one image frame for artificial intelligence and multiple basic image frames to be outputted as an image through the display; and a processor which controls the display to, while outputting the basic image frames as an image, output the image frame for artificial intelligence as an image in compliance with a configuration condition, wherein the outputted image includes at least one image frame for artificial intelligence inserted between the basic image frames. In accordance with to the present disclosure, a single display can provide both an image for humans and an image which can be recognized by artificial intelligence, whereby the display can be utilized as a platform for communication with artificial intelligence as well as humans.

16 Claims, 13 Drawing Sheets

(51) Int. Cl.
*G08G 1/16* (2006.01)
*H04N 7/18* (2006.01)
*B60R 1/20* (2022.01)

(52) U.S. Cl.
CPC .......... *B60R 1/20* (2022.01); *B60R 2300/304* (2013.01); *G06V 2201/08* (2022.01)

(56) References Cited

FOREIGN PATENT DOCUMENTS

| KR | 10-2018-0113149 A | | 10/2018 |
|----|-------------------|---|---------|
| KR | 20180113149 A | * | 10/2018 |
| KR | 10-2019-0000843 A | | 1/2019 |

OTHER PUBLICATIONS

International Search Report (English Translation) from corresponding PCT Application No. PCT/KR2021/004605, dated Sep. 9, 2021 (Year: 2021).*
International Search Report from corresponding PCT Application No. PCT/KR2021/004605, dated Sep. 9, 2021.
Fujitsu Laboratories Ltd., Fujitsu Streamlines AI Video Recognition with High-Quality Compression Technology, Mar. 5, 2020.

* cited by examiner

FIG. 7
(a)
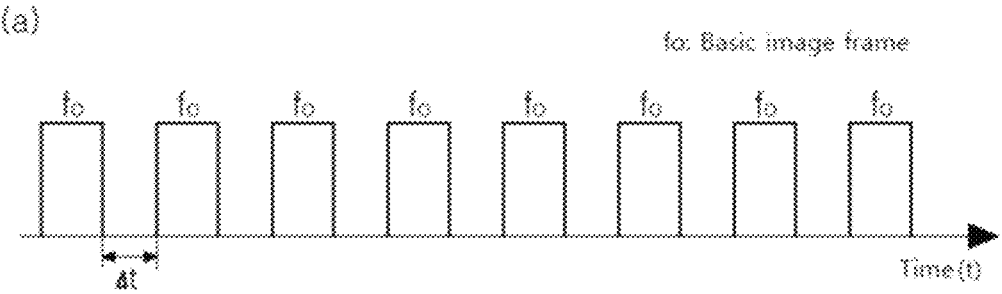
(b)
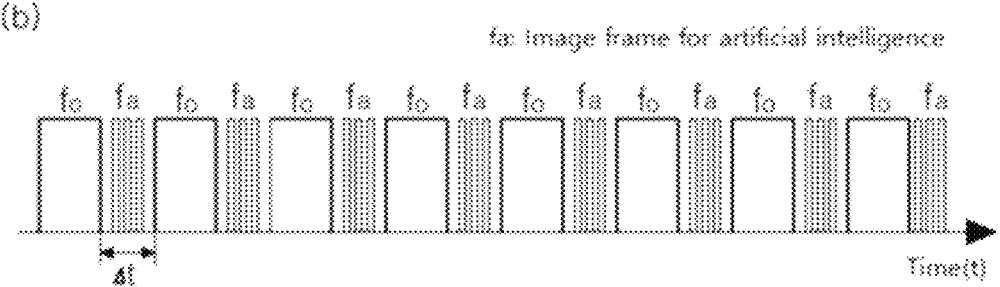
(c)
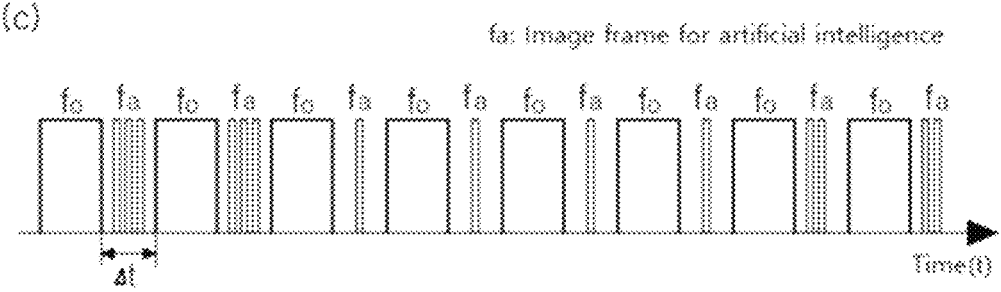

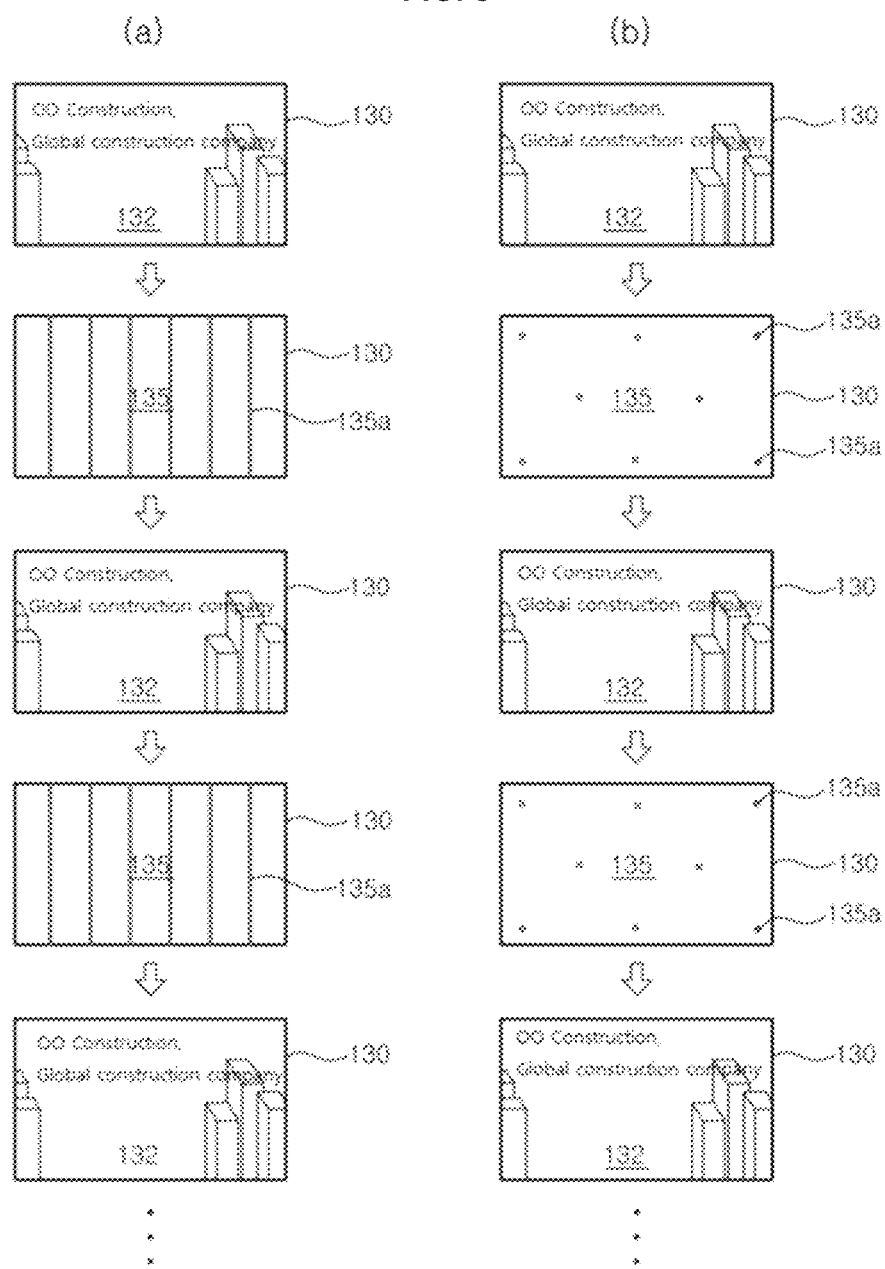

FIG. 14
(a)
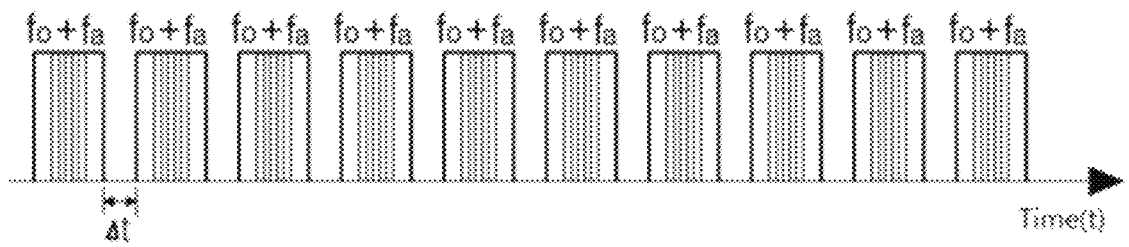
(b)
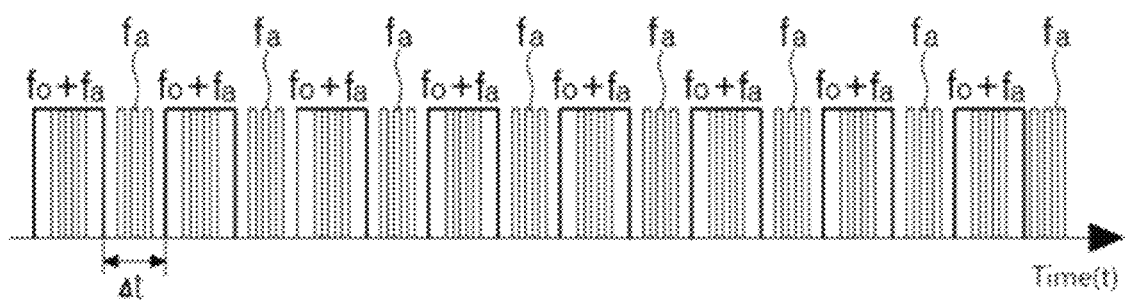

FIG. 16
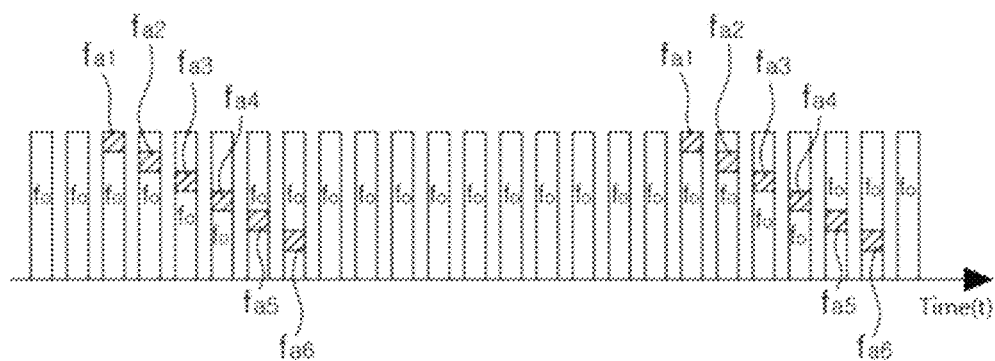
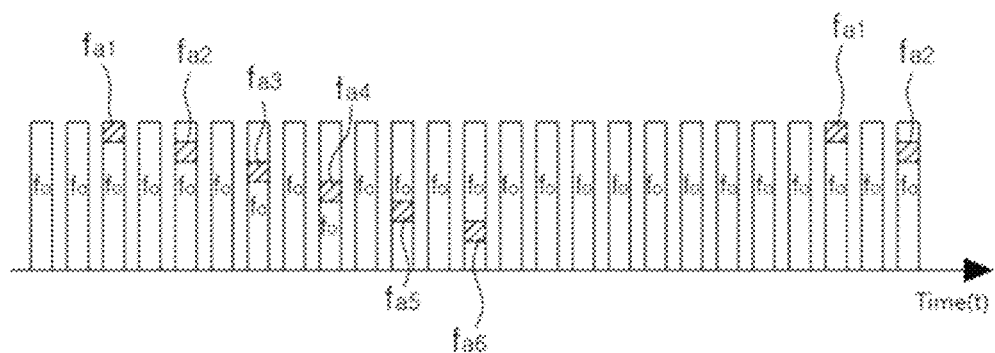

IMAGE PROCESSING METHOD AND DEVICE FOR PROVIDING IMAGE FOR ARTIFICIAL INTELLIGENCE AND INFORMATION PROVISION SYSTEM FOR ARTIFICIAL INTELLIGENCE VEHICLE

CROSS-REFERENCE TO RELATED APPLICATIONS

This application is a national phase application of PCT Application No. PCT/KR2021/004605, filed on Apr. 13, 2021, which claims benefit of Korean Patent Application No. 10-2020-0046060, filed on Apr. 16, 2020. The entire disclosure of the applications identified in this paragraph are incorporated herein by references.

TECHNICAL FIELD

The present invention relates to an image processing technology, and more particularly to an image processing method and a device for providing both an image for humans and an image that can be recognized only by devices with artificial intelligence in one display.

BACKGROUND ART

It is a recent common trend to install a digital information display or DID for providing news, information and advertisements to people in public places or places with high foot traffic, and a new emerging communication platform industry is the digital signage industry for providing network services and interactive services based on the DID.

However, a conventional display is limited in terms of its use for providing visual information to humans.

For example, for commercializing autonomous technology based on artificial intelligence for vehicles, drones, robots and the like, emerging as a key technology of the Fourth Industrial Revolution, artificial intelligence is required to acquire information through displayed images as humans do.

However, since current displays output images for humans, it is unavoidable their causing inconvenience to people in viewing the images for artificial intelligence when they are outputted in the conventional method.

To address this issue, it is necessary to develop a method for providing both information for humans and information for devices with artificial intelligence, but providing an image not causing any inconvenience or problem when they view the image, through the same display.

Meanwhile, if many displays are installed around a path where a vehicle with artificial intelligence drives, there can be a recognition error that the vehicle with artificial intelligence determines the image through the display is a real image when it analyzes the image captured by a camera to recognize the surrounding environment, and it is thus necessary to provide a method for preventing such a case.

For example, recent most autonomous vehicles use artificial intelligence as a means for recognizing and classifying surrounding objects, and the artificial intelligence classifies various objects, e.g., vehicles, lanes, signboards, traffic lights and pedestrians in the image captured by a camera, examines object speeds and directions to determine driving strategies and control vehicle speeds and directions as shown in FIG. 1.

By the way, there is a potential erroneous recognition that the displayed image included in the image captured by a camera is a real object in image analysis by means of artificial intelligence.

As an example, assuming that a large display 50 installed around the driving path of a drone 10 outputs, e.g., an image including a building image 52 and a sky image 54, an artificial intelligence image analysis model recognizes the whole display 50 in the image captured by a camera as a fixed obstacle and it should set up a path bypassing the obstacle, as shown in FIG. 2.

By the way, when the artificial intelligence image analysis model recognizes the building image 52 in the image as a fixed obstacle and the sky image 54 between the building image 52 and the building image 52 as a free space for its driving, an accident of the drone 10 crashing with the display 50 can happen by setting up a driving path in the arrow direction towards the central part of sky image 54.

As another example shown in FIG. 3, assuming that a large display 50 installed around a road of driven autonomous vehicle 20 outputs, e.g., a road image 56, the artificial intelligence image analysis model recognizes the whole display 50 in the image captured by a camera as a fixed obstacle and should set up a path bypassing the display 50.

By the way, when the artificial intelligence image analysis model recognizes the road image 56 in the image as a real road, an accident of a vehicle 20 straying off the normal road or crashing with the display 50 can happen by setting up a driving path in the arrow direction toward the road image 56.

Therefore, it is required to provide a method for preventing erroneous recognition that can happen due to a display installed around a driving path for safe driving of an autonomous vehicle based on artificial intelligence for analyzing an image captured by a camera to recognize its surrounding environment.

PRIOR-ART TECHNOLOGY PATENT

Korea Patent Publication No. 10-2019-0001668, open date: Jan. 7, 2019.

DISCLOSURE

Technical Problem

Therefore, the present invention provides a method for providing both an image for humans and an image recognized only by vehicles with artificial intelligence through one display to solve the aforementioned problems.

Furthermore, the present disclosure aims to prevent a vehicle with artificial intelligence from misrecognizing an object included in an image shown through the display as a real object.

Moreover, the present disclosure aims to prevent accidents that an autonomous vehicle based on artificial intelligence misrecognizes an object included in an image shown on a display screen as a real object to result in crashing with the display or straying off a normal path.

Technical Solution

To address the aforementioned problems, a first aspect of the present disclosure is to provide an image processing device, including a display; a memory for storing multiple basic image frames and at least one image frame for artificial intelligence to be outputted as an image through the display; and a processor controlling the display to output the image frame for artificial intelligence as an image in compliance with a predetermined condition while outputting the basic image frames as an image wherein it controls the display to insert at least one image frame for artificial intelligence between the basic image frames and output them as an image.

In the image processing device in accordance with the first aspect of the present disclosure, the image frame for artificial intelligence can be shorter than the basic image frame in terms of their duration.

In the image processing device in accordance with the first aspect of the present disclosure, the processor can control the display to overlap at least one image frame for artificial intelligence with the basic image frame.

In the image processing device in accordance with the first aspect of the present disclosure, the processor can control the display to divide the image frame for artificial intelligence into multiple frames and overlap the multiple divided image frames for artificial intelligence with the multiple basic image frames one by one every predetermined cycle.

In the image processing device in accordance with the first aspect of the present disclosure, the image frame for artificial intelligence can be shown only in some area of the display screen.

In the image processing device in accordance with the first aspect of the present disclosure, it can include a proximity sensor, and the processor can control the image frame for artificial intelligence to be outputted, provided that an approaching moving object is detected.

In the image processing device in accordance with the first aspect of the present disclosure, the processor can examine whether the approaching moving object is an autonomous vehicle, and control the image frame for artificial intelligence to be outputted, provided that the examination confirms it is an autonomous vehicle.

In the image processing device in accordance with the first aspect of the present disclosure, it can include a means for determining an operation mode by selecting one operation mode from a first operation mode for outputting only the basic image frame, a second operation mode for outputting only the image frame for artificial intelligence and a third operation mode for outputting the image frame for artificial intelligence while the basic image frame is outputted.

A second aspect of the present disclosure is to provide an image processing method including the steps of outputting a basic image frame as an image through a display; and outputting an image frame for artificial intelligence as an image in compliance with a predetermined condition while the basic image frame is outputted as an image, wherein at least one image frame for artificial intelligence is inserted between the basic image frames to output them as an image.

In the image processing method in accordance with the second aspect of the present disclosure, the image frame for artificial intelligence is shorter than the basic image frame in terms of their disclosure.

The image processing method in accordance with the second aspect of the present disclosure, the image frame for artificial intelligence is shown only in some area of the display screen.

In the image processing method in accordance with the second aspect of the present disclosure, the image frame for artificial intelligence can be outputted as an image in the step of outputting the image for artificial intelligence, provided that an approaching moving object is detected.

A third aspect of the present disclosure is to provide a system for providing information for a vehicle with artificial intelligence including: an image processing device including a display, a memory for storing multiple basic image frames and at least one image frame for artificial intelligence, and a processor for controlling the display to output the image frame for artificial intelligence as an image in compliance with a predetermined condition while the basic image frame is outputted as an image wherein it controls the display to insert the image frame for artificial intelligence between the basic image frames to output them as an image; and a vehicle with artificial intelligence including a camera, a unit for identifying an image for artificial intelligence for examining whether the image captured by the camera includes the image frame for artificial intelligence outputted as an image through the display and acquiring information for artificial intelligence from the image frame for artificial intelligence, an artificial intelligence unit for analyzing the image captured by the camera to classify the objects in the image and create control commands, and a processor for processing the information for artificial intelligence acquired from the unit for identifying an image for artificial intelligence and the control commands created by the artificial intelligence unit.

In the system for providing information in accordance with the third aspect of the present disclosure, the image frame for artificial intelligence can include a crash warning image, and the artificial intelligence unit can consider the area with the crash warning image in the image captured by the camera as a fixed object and perform an image analysis when the unit for identifying an image for artificial intelligence identifies the crash warning image.

In the system for providing information in accordance with the third aspect of the present disclosure, the vehicle with artificial intelligence can further include a distance sensor, and the artificial intelligence unit can include a deep-learning algorithm to have input of the image captured by the camera, values measured by the distance sensor, and the information for artificial intelligence examined by the unit for identifying an image for artificial intelligence through its input nodes.

In the system for providing information in accordance with the third aspect of the present disclosure, the vehicle with artificial intelligence can include a communication unit for sending its identification information to the image processing device through wireless communication.

Advantageous Effects

In view of the above and in accordance with the present disclosure, since both an image for humans and an image recognized with artificial intelligence can be provided in one display, the display can be used as a communication platform with artificial intelligence as well as humans.

In accordance with the present disclosure, erroneous recognition that the artificial intelligence for image analysis misrecognizes an object included in an image shown on a display as a real object can be avoided, and accidents that an autonomous vehicle collides with the display or strays from a normal path can thus be prevented. Moreover, in accordance with the present disclosure, since the artificial intelligence for image analysis can consider a whole display as a fixed obstacle to exclude it from analysis when the artificial intelligence makes an image analysis to know there is a pattern registered in advance in the image captured by a camera, the number of objects in the image captured by a camera to be analyzed by the artificial intelligence can be reduced to result in significantly improved faster computation and determination by the artificial intelligence.

DESCRIPTION OF DRAWINGS

FIG. 7 shows a frame configuration for a method for displaying an image for artificial intelligence in accordance with an embodiment of the present disclosure;

FIG. 8 shows an image shown through a display in accordance with an embodiment of the present disclosure;

FIG. 14 shows an exemplary different frame configuration of a method for displaying an image for artificial intelligence;

FIG. 16 shows an exemplary varied frame configuration of a method for displaying an image for artificial intelligence.

BEST MODE

The specific embodiments of present disclosure will now be described in detail by referring to the accompanying drawings.

It should be noted that a certain part including or having an element means it's further including or having another element, not excluding another element where there is no description specifically opposite in this specification. Moreover, the case that an element is connected, combined or communicates with another element includes the case of indirect connection, combination or communication with another element being between them as well as the case of direct connection, combination or communication with another element. Moreover, direct connection or combination of an element with another element means there is no element between them. Furthermore, it should be noted that the drawings accompanied by this specification are illustrated to facilitate readily understanding the idea of the present disclosure, and they do not limit the scope of right of present disclosure.

The present disclosure relates to an image processing device for outputting both a basic image recognized by humans and an image for artificial intelligence that can be recognized only thereby, and a vehicle with artificial intelligence using the device.

Figure 1:
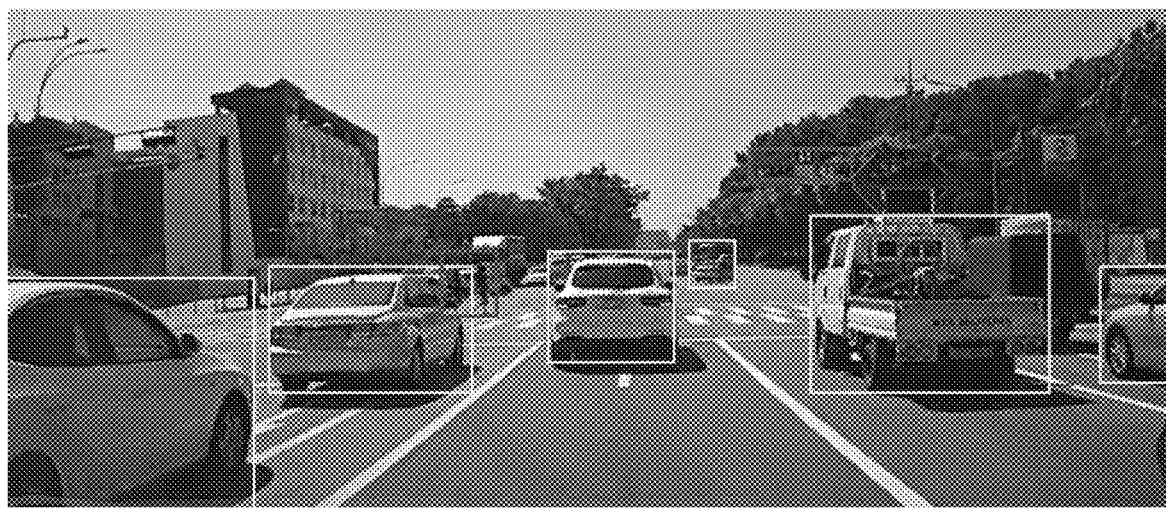
FIG. 1 shows an exemplary classification of objects in an image captured by a camera by artificial intelligence for image analysis.
Figure 2:
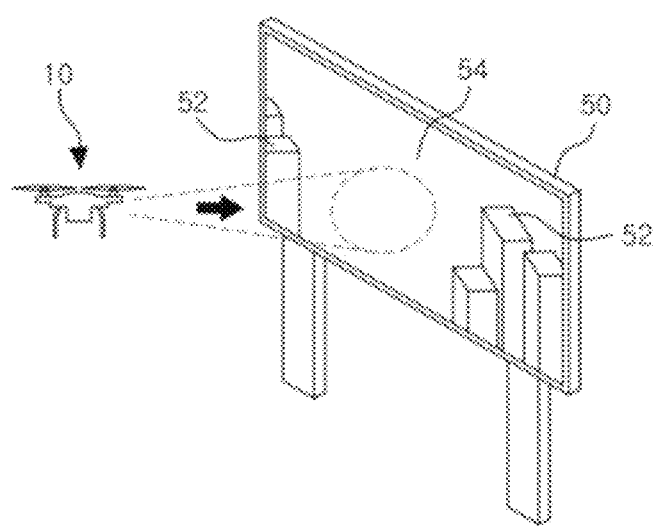
FIGS. 2 and 3 show exemplary cases of an autonomous vehicle crashing with a display.
Figure 3:
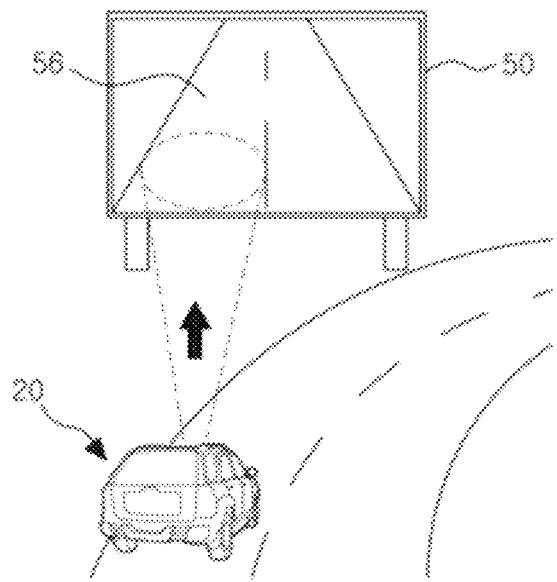
Figure 4:
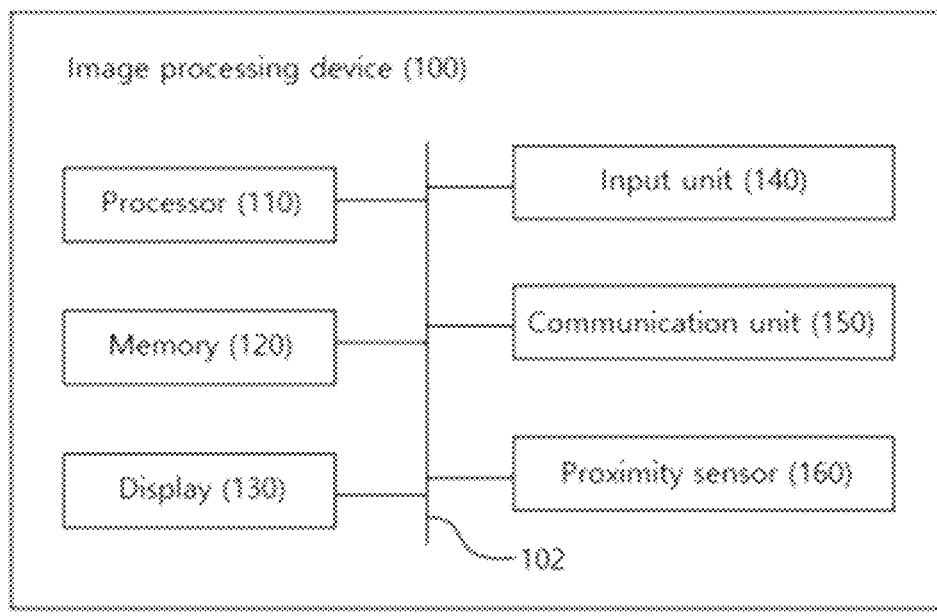
FIG. 4 is a block diagram for an image processing device in accordance with an embodiment of the present disclosure.

Firstly, the image processing device 100 in accordance with an embodiment of the present disclosure can include a processor 110, a memory 120, a display 130, an input unit 140, a communication unit 150, a proximity sensor 160, and a bus 102 as shown in the block diagram of FIG. 4.

The processor 110 executes a computer program stored in the memory 120 to perform a given computation or data processing. The processor 110 can include at least one selected from a CPU or Central Processing Unit and a GPU or Graphics Processing Unit.

The memory 120 can include a non-volatile memory, e.g., flash memory, and a volatile memory, e.g., RAM or random access memory. Moreover, the memory 120 can include a large storage, e.g., HDD, SSD, or CD-ROM.

The memory 120 can store a computer program for operating the image processing device 100, basic image data and image data for artificial intelligence to be outputted through the display 130. The computer program and/or the image data can be stored in the non-volatile memory and loaded onto the volatile memory to be executed.

Figure 5:
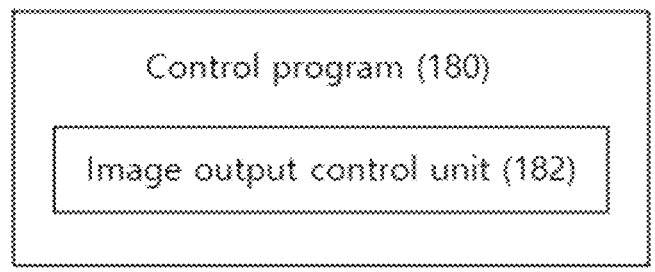
FIG. 5 is a functional block diagram of a control program.

The computer program stored in the memory 120 can include a control program 180 for controlling the output of the display 130, and the control program 180 can include an image output control unit 182 shown in the block diagram of FIG. 5.

The image output control unit 182 controls the display 130 to output the image for artificial intelligence in accordance with a predetermined method. A specific method for outputting an image for artificial intelligence will be described below.

Although the image output control unit 182 is shown as software of program type stored in the memory 120, it should be noted that it is not limited thereto. For example, at least some of the functions among image output control functions can be implemented as hardware, or a combination of software with hardware. To this end, the hardware can be an ASIC or Application Specific Integrated Circuit.

The display 130 can include a panel for displaying images and a driver IC for applying electrical signals to each pixel of the panel. The panel is not limited to a specific type, can be a flat panel, e.g., LCD, LED, OLED, PDP, or an LED display, and can be a device displaying images in other manner. Furthermore, and the display 130 can be a display showing holograms.

The input unit 140 can include at least one selected from a keyboard, a button, a touch pad, a touch screen, a mouse, and a joystick as an input means for an administrator or a user of the image processing device 100. A communication interface sending a control signal received from the communication unit 150 to the processor 110 can function as the input unit 140.

The communication unit 150 can include a wired and/or wireless communication module, and is not limited to a specific type. The wireless communication module can include at least one selected from a short-range wireless communication module, e.g., Wi-Fi, Bluetooth, Z-wave, Zigbee, BLE or Bluetooth Low Energy, UWB or Ultra-Wideband, at least one selected from LPWA or Low Power Wide-Area communication modules, e.g., LTE-M, NB-lot or NarrowBand-Internet of Things, LoRa or Long Range Wide Area Network, or a mobile communication module to access a mobile communication network.

Furthermore, the communication unit 150 can include at least one selected from V2X communication interfaces. The V2X or Vehicle to Everything can include, e.g., vehicle to vehicle or V2V communication, vehicle to infrastructure or V2I communication, vehicle to pedestrian or V2P communication or vehicle to network or V2N communication.

The proximity sensor 160 for detecting the presence of nearby moving objects can include at least one selected from a radar sensor, an ultrasonic sensor, and a laser sensor. Moreover, the proximity sensor 160 can be an image analysis device or image analysis software for analyzing an image captured by a camera and determining a potential presence of a moving object.

The proximity sensor 160 is for controlling output of an image for artificial intelligence and/or a basic image only when a moving object approaches, and can be used for reducing consumption of power by outputted images in an area without frequent driving of autonomous vehicles.

The proximity sensor 160 can be omitted.

The bus 102 sends electrical signals between the elements 110, 120, 130, 140, 150 and 160 of the image processing device 100, and can be a cable or a circuit pattern.

Figure 6:
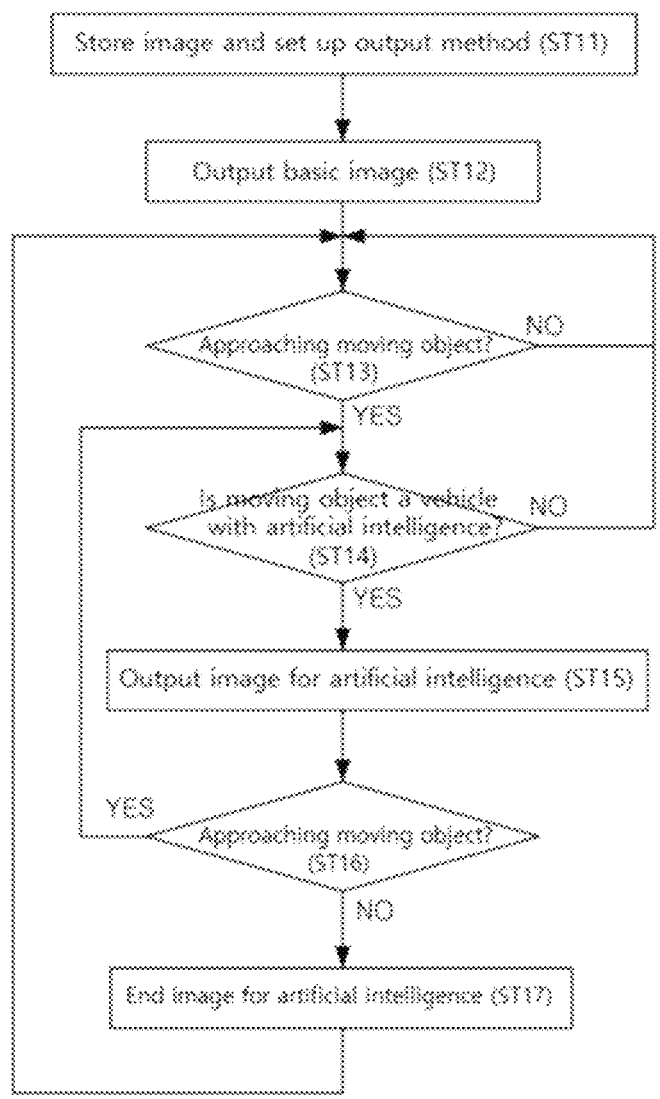
FIG. 6 is a flow chart illustrating a process in which an image processing device in accordance with an embodiment of the present disclosure outputs an image for artificial intelligence.

Referring to FIG. 6, a method for outputting an image for artificial intelligence by the image processing device 100 in accordance with an embodiment of the present disclosure will be described below.

Firstly, while the image processing device 100 stores the basic image and the image for artificial intelligence to be outputted in the memory 120, the image output control unit 182 is required to set up parameters, e.g., image output conditions, duration, output cycles, and an output method for artificial intelligence to be referred to for outputting the image for artificial intelligence.

The output conditions for the image for artificial intelligence can be classified as, e.g., output at all times, cyclic output, and output when a moving object approaches.

Moreover, the method for outputting an image for artificial intelligence can be divided into a method for inserting an image frame for artificial intelligence between the basic image frames, a method for overlapping the image frame for artificial intelligence with the basic image frames, and a method for overlapping the frames of divided image for artificial intelligence with the basic image frames in step ST11.

When the image processing device 100 starts to operate, the processor 110 outputs the basic image through the display 130 in compliance with a predetermined condition. The processor 110 examines the output conditions for the image for artificial intelligence, and can output the image for artificial intelligence in accordance with the predetermined method where the output condition is 'output at all times' or 'cyclic output' in step ST12.

Where the output condition is 'output when a moving object approaches', the processor 110 uses the detection result of proximity sensor 160 to determine the potential presence of a moving object in step ST13.

When the processor 110 determines a moving object approaches, it can output an image for artificial intelligence through the display 130 in accordance with the predetermined method, or examine whether the moving object is a vehicle with artificial intelligence once again as illustrated in FIG. 6.

For example, it is because the image for artificial intelligence is not required to be outputted when a vehicle driven by a human driver approaches.

Whether an approaching moving object is a vehicle with artificial intelligence can be known by means of vehicle identification information acquired through wireless communication with the vehicle with artificial intelligence. For example, the identification information of an autonomous vehicle can be obtained and used to examine whether the vehicle is approaching by means of V2X communication which is a specification for autonomous driving communication in step ST14

When the approaching moving object is known as a vehicle with artificial intelligence, the processor 110 outputs an image for artificial intelligence through the display 130 in accordance with the predetermined method in step ST15.

Meanwhile, where the approaching moving object has passed or another moving object does not approach, outputting the image for artificial intelligence can stop. To this end, the processor 110 continues to monitor whether a moving object approaches, finishes outputting the image for artificial intelligence and can output only the basic image in steps ST16 and ST17.

Referring to FIG. 7, a method for outputting the image for artificial intelligence in accordance with an embodiment of the present disclosure will be described below.

In general, the display 130 outputs multiple basic image frames fo in a cycle with a given pause Δt to output the basic image as shown in FIG. 7A.

The method for outputting the image for artificial intelligence in accordance with an embodiment of the present disclosure is for using the pause Δt in order to insert an image frame for artificial intelligence fa in each pause Δt between the basic image frames fo as shown in FIG. 7B about a frame configuration. Although the inserted image frame for artificial intelligence fa is preferably shorter than the basic image frame fo in terms of their duration, it is just an example.

Meanwhile, since the performance of a high-speed camera is a minimum of 1,000 fps or frame per second although it is a budget type camera and human eyes can see things roughly around 60 Hz, a vehicle with artificial intelligence can readily see by means of a high-speed camera although an image disappears very fast so that human eyes cannot see when a high-speed camera is equipped in the vehicle with artificial intelligence.

Therefore, as shown in FIG. 7B, where image frames for artificial intelligence fa are inserted in the short pause Δt between the basic image frames fo, various images for vehicles with artificial intelligence can be provided without any interference with human's seeing the basic image.

Meanwhile, although it is shown that respective three image frames for artificial intelligence fa are inserted in each pause Δt between basic image frames fo in FIG. 7B, the insertion scheme is not limited thereto. For example, as shown in FIG. 7C, it is not necessary that the number of image frames for artificial intelligence fa inserted in each pause Δt between the basic image frames fo is always the same, and the duration of image frames for artificial intelligence fa is always the same.

Moreover, no information is outputted through the basic image frames fo, but information for vehicles with artificial intelligence can be outputted through the image frames for artificial intelligence fa.

Furthermore, the display 130 can be set up to be in the artificial intelligence-only mode to output only image frames for artificial intelligence fa at high speed and send a large amount of information to the vehicles with artificial intelligence. In this case, human eyes will be able to see only a phenomenon of blinks.

FIG. 8 shows an image for artificial intelligence 135 inserted between the basic images 132 to be outputted through the display 130. While the images shown in the image 135 for artificial intelligence are not limited to a specific type, they can include a pattern for artificial intelligence 135a of stripe type shown in FIG. 8A, or a pattern for artificial intelligence 135a of dot type human eyes cannot see at different locations of the display 130 as shown in FIG. 8B.

In addition, patterns for artificial intelligence 135a consisting of the image for artificial intelligence 135 can be implemented in many different ways.

Figure 9A:
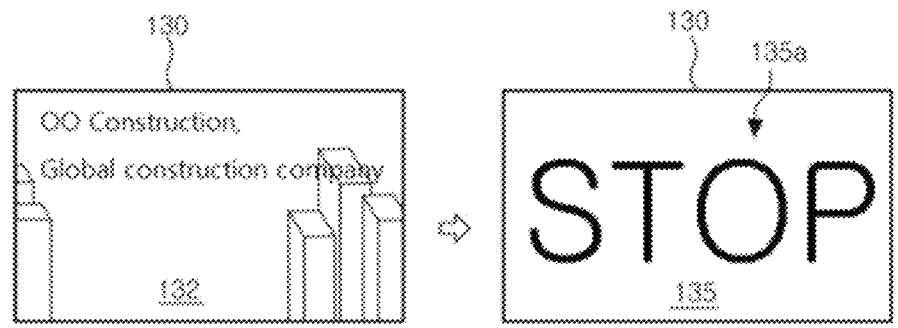
FIGS. 9A, 9B and 9C show different images for artificial intelligence.

Referring to FIG. 9A showing an example, the pattern for artificial intelligence 135a can include some characters.

Figure 9B:
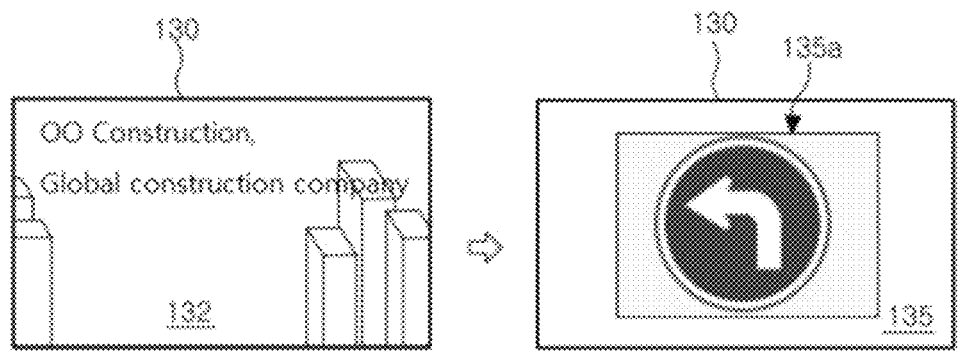

Referring to FIG. 9B showing another example, the pattern for artificial intelligence 135a can be a road sign pattern. In this example, humans can recognize that the display 130 outputs information or advertisements, and a vehicle with artificial intelligence 200 can recognize the display 130 functioning as a road sign.

Figure 9C:
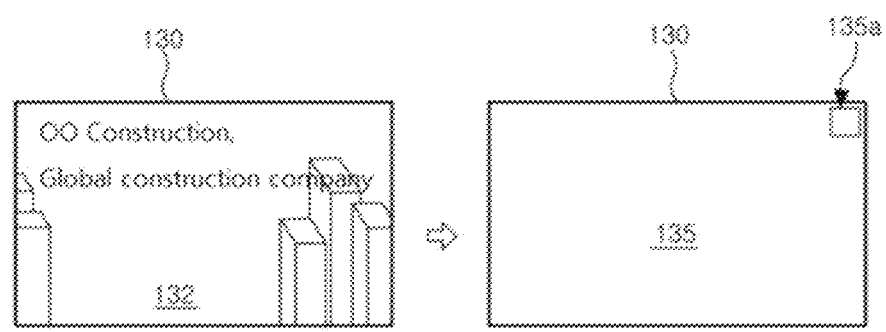

Referring to FIG. 9C showing still another example, some area specified, not all areas of the display 130, can display the pattern for artificial intelligence 135a.

Meanwhile, where the frame rate fps of the frames for artificial intelligence fa is too high or the frame duration is too long in whatever method the image for artificial intelligence is outputted, human eyes can see the image for artificial intelligence and seeing the basic image can be interrupted. Therefore, it is preferred to select a proper frame rate and/or a duration of the frame for artificial intelligence fa so that human eyes cannot see the image for artificial intelligence.

Moreover, where the frame rate of the frames for artificial intelligence fa is too low or the frame duration is too short, the vehicles with artificial intelligence 200 cannot recognize the image for artificial intelligence by analyzing the image captured by the camera in some cases. Therefore, it is preferred to select a proper frame rate and/or a duration of the frames for artificial intelligence fa in consideration of fps performance of the camera equipped in the vehicles with artificial intelligence 200.

Next, the vehicle with artificial intelligence 200 will be described in accordance with an embodiment of the present disclosure.

Figure 10:
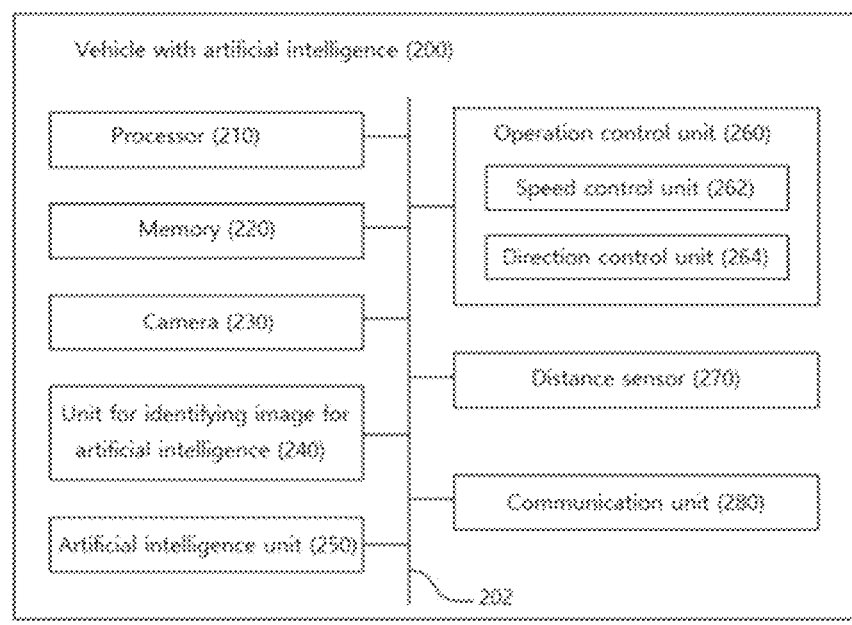
FIG. 10 is a block diagram for a vehicle with artificial intelligence in accordance with an embodiment of the present disclosure.

Referring to FIG. 10 showing the block diagram, the vehicle with artificial intelligence 200 can include a processor 210, a memory 220, a camera 230, a unit for identifying an image for artificial intelligence 240, an artificial intelligence unit 250, an operation control unit 260, a distance sensor 270, a communication unit 280, and a bus 202.

The processor 210 executes a computer program stored in the memory 220 to perform given computation or data processing. The processor 210 can include at least one selected from a CPU and a GPU.

The memory 220 can include a non-volatile memory and a volatile memory. Furthermore, the memory 220 can include a large storage, e.g., an HDD, an SSD or a CD-ROM. The memory 220 can store a computer program, a control parameter, or data for operating the vehicle with artificial intelligence 200. The computer program, the control parameter and the data can be stored in the non-volatile memory and loaded onto the volatile memory to be executed.

The camera 230 for acquiring images around the vehicle is not limited to a specific type. However, it is preferred that the image creation frame rate fps of the camera 230 is even greater than the image output frame rate fps of the display 130 to capture the image for artificial intelligence 135 outputted for a short time through the display 130 of the image processing device 100.

The unit for identifying an image for artificial intelligence 240 determines whether the image captured by the camera 230 includes an image for artificial intelligence 135. Specifically, it determines whether the image included in the image captured by the camera and shown on the display 130 includes the image for artificial intelligence 135.

It is preferred the unit for identifying an image for artificial intelligence 240 analyzes each frame of the image captured by the camera to determine whether there is an image for artificial intelligence 135 or a frame including the pattern for artificial intelligence 135a registered in advance.

When the unit for identifying an image for artificial intelligence 240 identifies an image for artificial intelligence 135, the processor 210 can control the operation of vehicle with artificial intelligence 200 on the basis of the information acquired from the image for artificial intelligence 135.

Moreover, the unit for identifying an image for artificial intelligence 240 can examine the image for artificial intelligence 135 and send the resultant information to the artificial intelligence unit 250.

Meanwhile, the pattern of image for artificial intelligence 135 can be varied depending on capturing angles, distances, illumination and weather conditions to capture the image for artificial intelligence 135 outputted through the display 130 by means of the camera 230.

Therefore, it is preferred that the unit for identifying an image for artificial intelligence 240 stores all different possible patterns of the image for artificial intelligence 135 or learns them through machine learning in advance. For machine-learning the patterns of image for artificial intelligence 135, exemplary available algorithms include the supervised learning algorithm, and the deep-learning image analysis algorithm.

The artificial intelligence unit 250 uses the image captured by the camera 230, the image for artificial intelligence 135 acquired from the unit for identifying an image for artificial intelligence 240 and the distance information acquired from the distance sensor 270 to control the operation of vehicle with artificial intelligence 200.

The artificial intelligence algorithm executed in the artificial intelligence unit 250 is not limited to a specific type. For example, a deep-learning algorithm based on the Artificial Neural Network or ANN, e.g., a Deep Neural Network or DNN, a Convolutional Neural Network or CNN, or a Recurrent Neural Network or RNN can be used to control the operation of vehicle with artificial intelligence 200.

Figure 11:
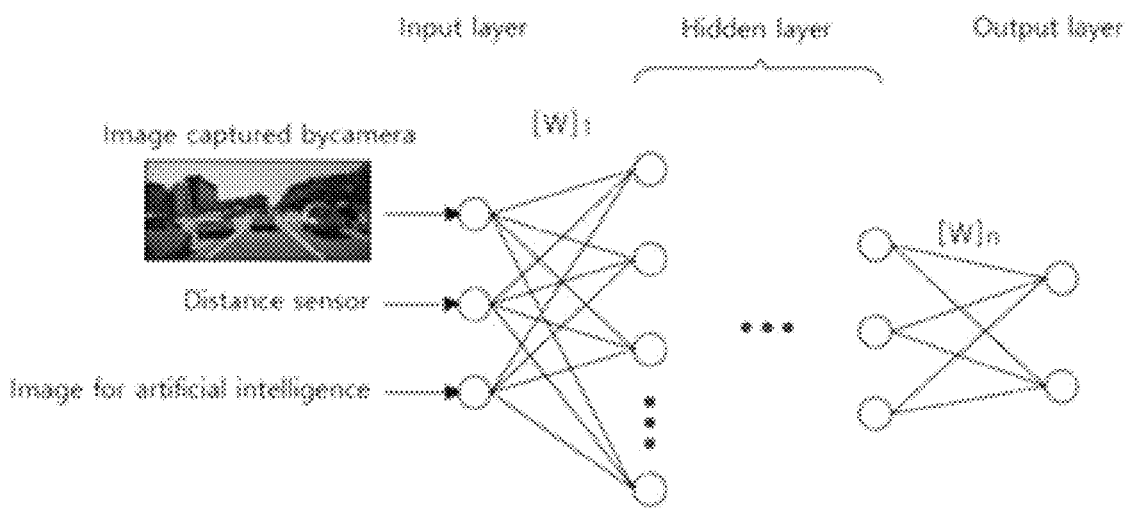
FIG. 11 shows an exemplary deep-learning model architecture.

The ANN of deep-learning algorithm has one or more hidden layers between the input layer and the output layer as shown in FIG. 11, and learning by means of the deep-learning algorithm is a process of optimizing the weight [W]1, . . . , [W]n given between a first layer node, neuron, and a second layer node, neuron.

The deep-learning algorithm can apply the Gradient Descent Method to update each weight [W]1, . . . , [W]n on the basis of the error between the output value of output node and the target value every learning cycle or every predetermined cycle in order to continue to improve the accuracy of output values.

Where the vehicle with artificial intelligence 200 is an autonomous vehicle, exemplary inputs into each input node of the input layer include the image captured by the camera 230, the image information for artificial intelligence identified by the unit for identifying an image for artificial intelligence 240, and the value measured by the distance sensor 270, and the output node of the output layer can output speed commands and/or direction commands to control the autonomous vehicle in response to the inputted information.

Exemplary commands for speed can include acceleration, deceleration, or stop commands, and exemplary commands for directions can include commands for vertical directions as well as horizontal directions.

The artificial intelligence unit 250 can be equipped as a module having its own processor, memory, and data, and can be software installed for using the processor 210 and the memory 220 of the vehicle with artificial intelligence 200 to perform computation. Moreover, all elements of the artificial intelligence unit 250 can be equipped in the vehicle with artificial intelligence 200, and can be implemented as a distributed system in which some functions are executed in a remote location allowing communication with the communication unit 280.

The operation control unit 260 responds to the command of the artificial intelligence unit 250 to control the operation of vehicle with artificial intelligence 200. Where the vehicle with artificial intelligence 200 is an autonomous vehicle, the operation control unit 260 can include a speed control unit 262 for controlling engine speed, motor speed, transmission and braking in response to the speed commands, and a direction control unit 264 for controlling driving directions in response to the direction commands.

The distance sensor 270 allowing the vehicle with artificial intelligence 200 to measure its distance from surrounding objects can include at least one selected from a radar sensor, an ultrasonic sensor, an infrared sensor, a laser sensor and LiDAR.

The communication unit 280 includes a wired and/or a wireless communication module, and is not limited to any specific type, The wireless communication module can include at least one selected from the short-range wireless communication modules, e.g., Wi-Fi, Bluetooth, Z-wave, Zigbee, BLE or UWB, at least one selected from LTE-M, NB-lot or the Low Power Wide-Area or LPWA communication module, a mobile communication module to access a mobile communication network, and at least one selected from the V2X communication interfaces.

The bus 202 for sending electrical signals between respective elements of the vehicle with artificial intelligence 200 can be a cable, a circuit pattern and the like.

Figure 12:
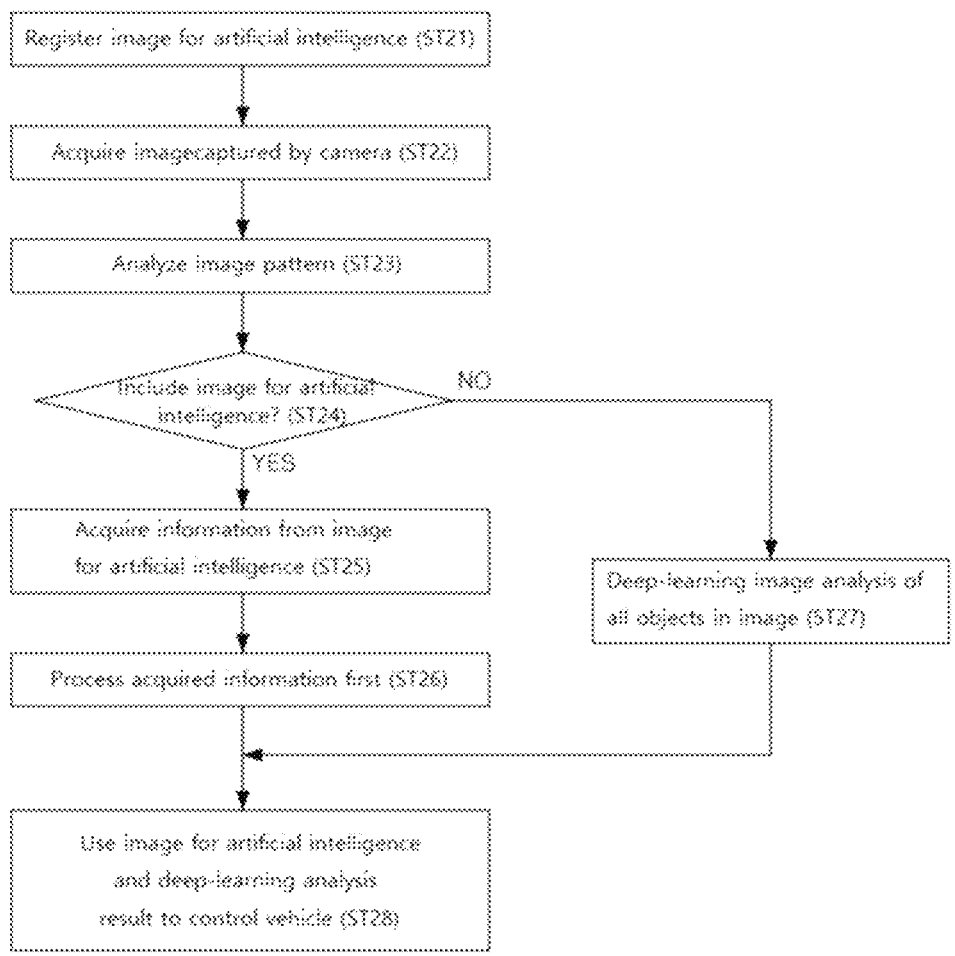
FIG. 12 is a flow chart illustrating a method for controlling a vehicle with artificial intelligence by using an image for artificial intelligence.

Referring to FIG. 12, the method for using the image for artificial intelligence to control the operation of vehicle with artificial intelligence 200 in accordance with an embodiment of the present disclosure will be described below.

Firstly, it is required to store the information about the image for artificial intelligence 135 outputted from the image processing device 100 in the memory 220 of vehicle with artificial intelligence 200 in advance in step ST21.

Subsequently, the vehicle with artificial intelligence 200 uses the camera 230 and captures the surrounding environment in step ST22.

The image captured by the camera 230 is sent to the unit for identifying an image for artificial intelligence 240, and the unit for identifying an image for artificial intelligence 240 analyzes each frame of the captured image to examine whether the image for artificial intelligence 135 is included in steps ST23 and ST24.

Where an image for artificial intelligence 135 is found, the unit for identifying an image for artificial intelligence 240 can acquire given information from the image for artificial intelligence 135. The information that can be acquired from the image for artificial intelligence 135 is not limited to a specific type. For example, the vehicle with artificial intelligence 200 can recognize just data or a given instruction in the image for artificial intelligence 135 in step ST25.

The processor 210 can process the information acquired from the unit for identifying an image for artificial intelligence 240 in a predetermined method. For example, the processor 210 can process the information acquired from the unit for identifying an image for artificial intelligence 240 first or in a predetermined order in step ST26.

Meanwhile, where the unit for identifying an image for artificial intelligence 240 examines whether the image captured by the camera includes the image for artificial intelligence or the image for artificial intelligence is not included in the image captured by the camera, the artificial intelligence unit 250 can make a deep-learning-based analysis for all objects included in the image captured by the camera in step ST27.

Therefore, the vehicle with artificial intelligence 200 in accordance with an embodiment of the present disclosure can control its operation or create given data by using the information acquired from the image for artificial intelligence 135, and use the deep-learning image analysis result of the artificial intelligence unit 135 to control its operation or create given data in step ST28.

Figure 13:
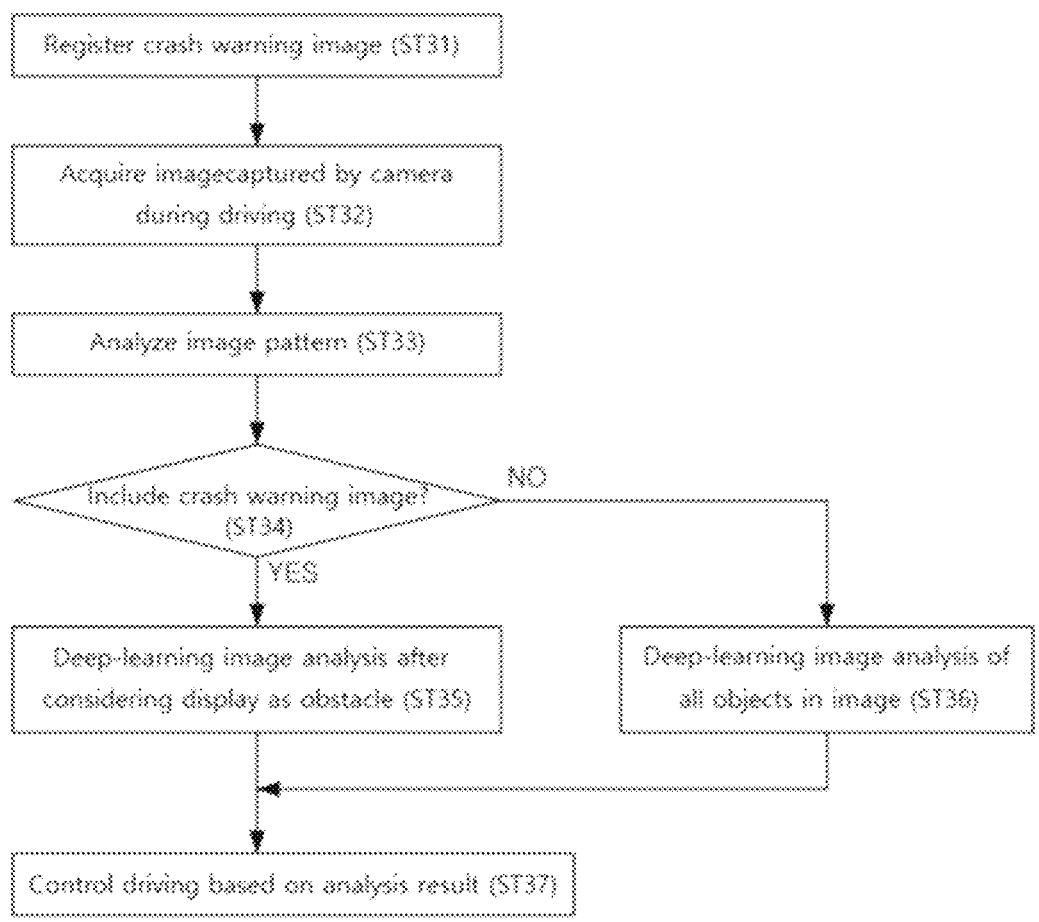
FIG. 13 is a flow chart illustrating a method for controlling driving of an autonomous vehicle with artificial intelligence by using an image for warning a crash.

Referring to the flow chart shown in FIG. 13, the method for controlling its driving by the autonomous vehicle with artificial intelligence 200 will be described below, assuming that the vehicle with artificial intelligence 200 is an autonomous vehicle with artificial intelligence, e.g., a vehicle, a drone or a robot, and the image for artificial intelligence 135 outputted from the image processing device 100 is a crash warning image.

Firstly, the information for the crash warning image 135 for artificial intelligence outputted from the image processing device 100 is stored in the autonomous vehicle with artificial intelligence 200 in step ST31.

Subsequently, the autonomous vehicle with artificial intelligence 200 uses the camera 230 to capture the surrounding environment while driving in step ST32.

The image captured by the camera 230 is sent to the unit for identifying an image for artificial intelligence 240 and the artificial intelligence unit 250 in real time; the unit for identifying an image for artificial intelligence 240 analyzes each frame of the captured image to examine whether there is a frame including the same pattern as the crash warning image for artificial intelligence 135; and the artificial intelligence unit 250 starts a deep-learning image analysis to classify objects included in the image captured by the camera in steps ST33 and ST34.

Where a crash warning image 135 for artificial intelligence is found in the frame of image captured by the camera, the unit for identifying an image for artificial intelligence 240 sends the concerned information to the artificial intelligence unit 250 which then considers the whole display 130 showing the crash warning image for artificial intelligence 135 as a fixed obstacle to make a deep-learning image analysis.

Since it is thus not necessary to make a deep-learning image analysis for the display 130 and the image shown on the display 130, the time for computation is significantly reduced and wrong recognition of the image shown on the display 130 is avoided to improve driving safety in step ST35.

Where the crash warning image for artificial intelligence 135 is not found in the frame of image captured by the camera, the artificial intelligence unit 250 makes a deep-learning image analysis of all objects included in the image captured by the camera in step ST36.

Subsequently, the artificial intelligence unit 250 outputs commands for speed and/or direction commands based on the result of deep-learning image analysis to control driving speed and/or directions in step ST37.

Meanwhile, the method for processing images or the method for controlling a vehicle with artificial intelligence in accordance with an embodiment of the present disclosure can be implemented in a program instruction type that can be executed through various computer means to be recorded on machine-readable recording media.

To this end, the machine-readable recording media can include a program instruction, data files or data architectures separately or a combination thereof. The program instruction recorded in the recording media can be specially designed and configured for the present disclosure, or can be an instruction known to and used by those skilled in computer software technology.

The machine-readable recording media can include at least one selected from magnetic media, e.g., hard disks, floppy disks and magnetic tapes, optical media, e.g., CD-ROMs and DVDs, magneto-optical media, e.g., floptical disks, ROM, RAM and flash memory.

Furthermore, the program instruction can include those created with a compiler and high-level language codes that can be executed by means of a computer by using interpreters.

Although the preferred embodiments of the present disclosure have been described above, it should be noted that the present disclosure should not be limited to the embodiments described above, and can be varied or modified in various forms in a specific application process.

Firstly, although the display 130 of image processing device 100 outputs both the basic image 132 for humans and the image for artificial intelligence 135 in the embodiments of the present disclosure, it should be noted that the operation method is not limited thereto.

For example, the operation mode of image processing device 100 can be divided into a first operation mode only for outputting the basic image 132, a second operation mode only for outputting the image for artificial intelligence 135 and a third operation mode for outputting both the basic image 132 and the image for artificial intelligence 135 in the aforementioned way, and an operation mode can be selected as required.

In this process, the processor 110 of the image processing device 100 can select a specific operation mode to comply with the predetermined condition, select an operation mode in response to administrator's instruction entered through the input unit 140 or the communication unit 150, or select an operation mode in response to the request of vehicle with artificial intelligence 200 received through the communication unit 150.

Secondly, it has been described above that the frame for artificial intelligence fa is inserted in the pause Δt between the basic image frames fo when the image for artificial intelligence 135 is outputted through the display 130 of image processing device 100, but the method is not limited thereto.

As an example, referring to FIG. 14A showing the frame configuration, the frame of image for artificial intelligence fa can overlap with the basic image frame fo to be outputted. This method is useful where the pause Δt between the basic image frames fo is very short.

Figure 15:
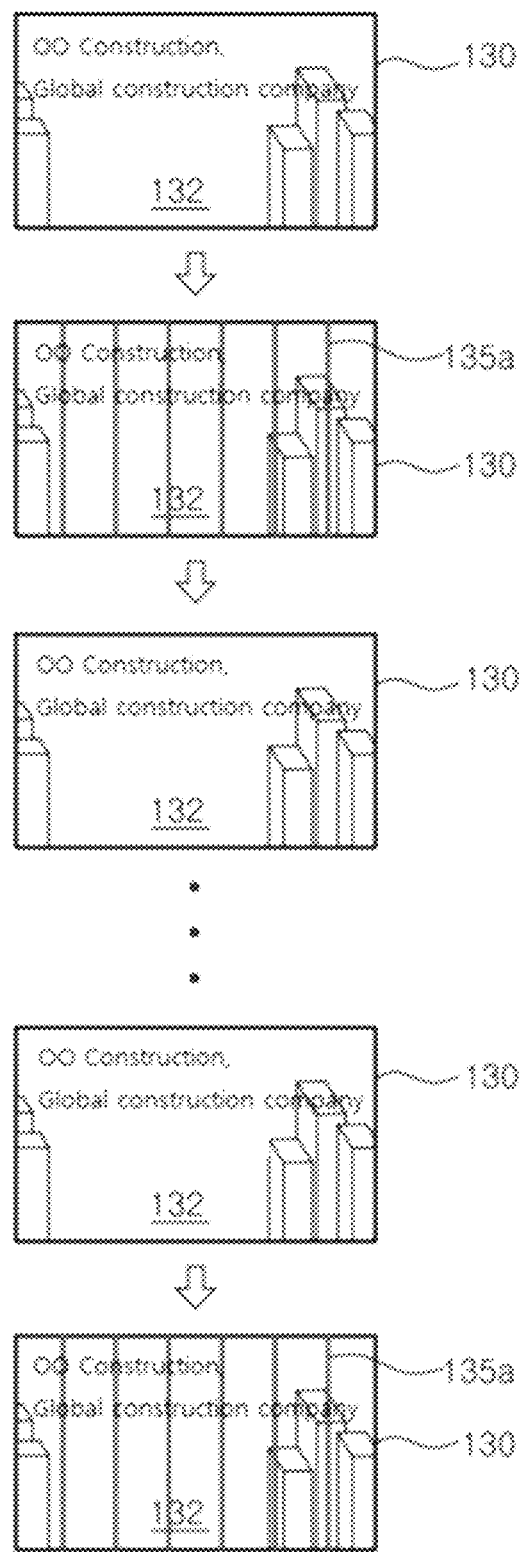
FIG. 15 shows an outputted image to which the frame configuration shown in FIG. 14 is applied.

FIG. 15 shows a cyclic output of the pattern for artificial intelligence 135a through the display 130 while the image for artificial intelligence 135 overlaps with the basic image 132.

Meanwhile, although FIG. 14A shows the same number of image frames for artificial intelligence fa overlapping with all basic image frames fo, this is only an example. Therefore, the number and/or the duration of image frames for artificial intelligence fa overlapping with each basic image frame fo can be different.

Moreover, while the basic image frame fo overlaps with the image frame for artificial intelligence fa in FIG. 14B showing the frame configuration, the image frame for artificial intelligence fa can also be inserted in the pause Δt between the basic image frame fo and outputted, if required.

Moreover, the image frame for artificial intelligence fa can be outputted by overlapping it with the basic image every predetermined cycle without consideration of the cycle of basic image frame fo and the pause Δt.

Another exemplary method in FIG. 16A showing the frame configuration is to divide the frame for artificial intelligence fa into multiple frames, e.g., fa1, fa2, fa3, fa4, fa5 and fa6 to overlap them with the basic image frame fo one by one and output them while the image frame for artificial intelligence fa overlaps with the basic image frame fo.

Figure 17:
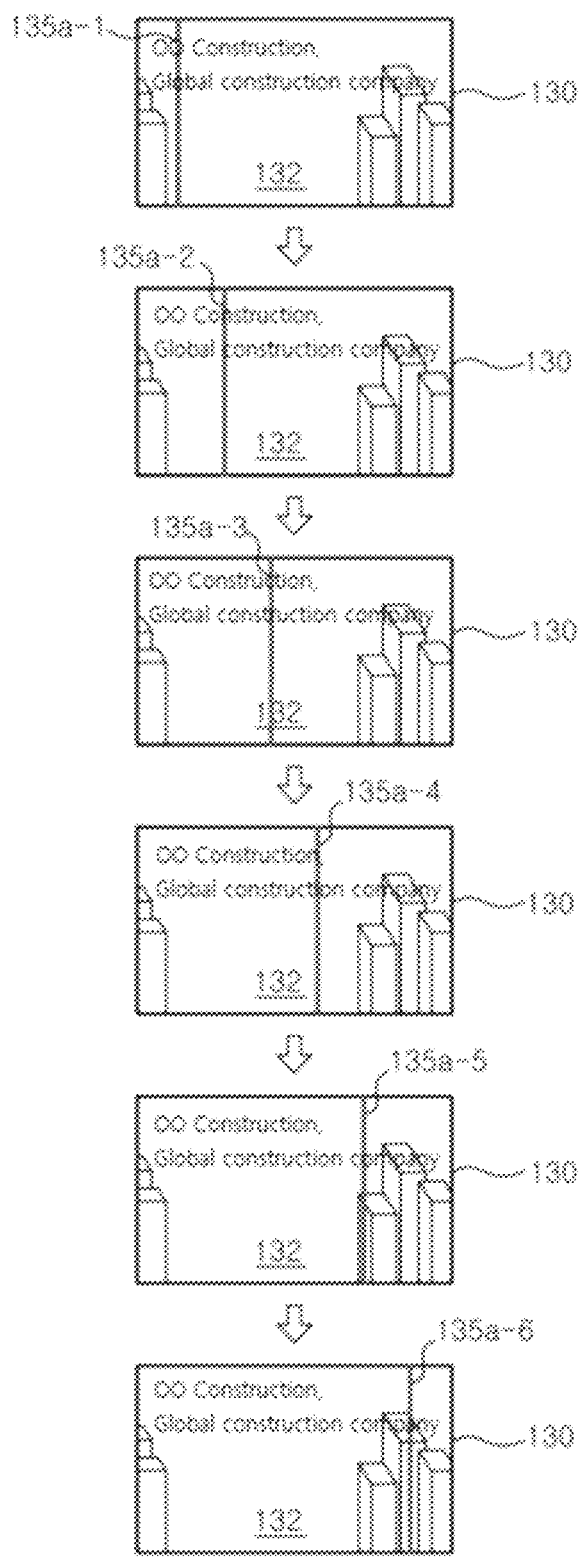
FIG. 17 shows an exemplary outputted image to which the frame configuration shown in FIG. 16 is applied.

Since such a method does not display all patterns for artificial intelligence 135a in one basic image 132 but the multiple divided patterns for artificial intelligence 135a-1, . . . , 135a-6 overlap with the multiple basic images 132 one by one to be displayed, a certain animation effect can be implemented, as shown in FIG. 17.

Although the multiple divided frames for artificial intelligence fa1, fa2, fa3, fa4, fa5 and fa6 are shown to overlap with the basic image frame fo one by one in FIG. 16A, it should be noted that it is just an example. For example, as shown in FIG. 16B, the divided image frames for artificial intelligence fa1, fa2, fa3, fa4, fa5 and fa6 can overlap with every other basic image frame fo one by one, or other overlapping scheme can be used, to provide an image for artificial intelligence in different ways.

As described above, a specific method for outputting the image frame for artificial intelligence fa through the display 130 can be varied or modified if required. However, it is also required to control the output cycle and/or the duration of the image frame for artificial intelligence fa appropriately so that viewers watching the basic image cannot perceive the image for artificial intelligence in whatever scheme it is outputted.

Thirdly, although the unit for identifying an image for artificial intelligence 240 is installed separately from the artificial intelligence unit 250 in the block diagram shown in FIG. 10, it should be noted that the installation is not limited thereto.

In operation, the unit for identifying an image for artificial intelligence 240 can be implemented on an artificial intelligence basis for which the unit for identifying an image for artificial intelligence 240 can be included in the artificial intelligence unit 250, or implemented as an independent artificial intelligence model.

As described above, it should be noted that the present disclosure can be varied or modified in various forms, and the varied or modified embodiments belong to the scope of right of the present disclosure where they include the technical idea of present disclosure claimed in the appended Claims.

DESCRIPTION OF NUMERALS

100: image processing device 110: processor 120: memory
130: display 132: basic image 135: image for artificial intelligence
135a: pattern for artificial intelligence 135a-1, . . . , 135a-6: divided pattern for artificial intelligence
140: input unit 150: communication unit 160: proximity sensor 180: control program 182: image output control unit
200: vehicle with artificial intelligence 210: processor 220: memory
230: camera 240: unit for identifying an image for artificial intelligence
250: artificial intelligence unit
260: operation control unit 262: speed control unit 264: direction control unit
270: distance sensor 280: communication unit
fo: basic image frame fa: image frame for artificial intelligence

What is claimed is:

1. An image processing device, comprising:
a display;
a memory for storing multiple basic image frames and at least one image frame for artificial intelligence to be outputted as an image through the display; and
a processor controlling the display to output the image frame for artificial intelligence as an image in compliance with a predetermined condition while outputting the basic image frames as an image, wherein it controls the display to insert at least one image frame for artificial intelligence between the basic image frames and output them as an image.

2. The image processing device of claim 1, wherein the image frame for artificial intelligence is shorter than the basic image frame in terms of their duration.

3. The image processing device of claim 1, wherein the processor controls the display to overlap at least one image frame for artificial intelligence with the basic image frame.

4. The image processing device of claim 3, wherein the processor controls the display to divide the image frame for artificial intelligence into multiple frames and overlap the multiple divided image frames for artificial intelligence with the multiple basic image frames one by one every predetermined cycle.

5. The image processing device of claim 1, wherein the image frame for artificial intelligence is shown only in some area of the display screen.

6. The image processing device of claim 1, comprising a proximity sensor, and
wherein the processor controls the image frame for artificial intelligence to be outputted, provided that an approaching moving object is detected.

7. The image processing device of claim 6, wherein the processor examines whether the approaching moving object is an autonomous vehicle, and controls the image frame for artificial intelligence to be outputted, provided that the examination confirms it is an autonomous vehicle.

8. The image processing device of claim 1, comprising a function for determining an operation mode by selecting one operation mode from a first operation mode for outputting only the basic image frame, a second operation mode for outputting only the image frame for artificial intelligence and a third operation mode for outputting the image frame for artificial intelligence while the basic image frame is outputted.

9. An image processing method, comprising the steps of:
outputting a basic image frame as an image through the display; and
outputting an image frame for artificial intelligence as an image in compliance with a predetermined condition while the basic image frame is outputted as an image,
wherein at least one image frame for artificial intelligence is inserted between the basic image frames to output them as an image.

10. The image processing method of claim 9, wherein the image frame for artificial intelligence is shorter than the basic image frame in terms of their duration.

11. The image processing method of claim 9, wherein the image frame for artificial intelligence is shown only in some area of the display screen.

12. The image processing method of claim 9, wherein the image frame for artificial intelligence is outputted as an image in the step of outputting the image for artificial intelligence, provided that an approaching moving object is detected.

13. A system for providing information for a vehicle with artificial intelligence, comprising:
an image processing device comprising: a display, a memory for storing multiple basic image frames and at least one image frame for artificial intelligence, and a processor for controlling the display to output the image frame for artificial intelligence as an image in compliance with a predetermined condition while the basic image frame is outputted as an image,
wherein it controls the display to insert the image frame for artificial intelligence between the basic image frames to output them as an image; and
a vehicle with artificial intelligence comprising: a camera, a unit for identifying an image for artificial intelligence for examining whether the image captured by the camera comprises the image frame for artificial intelligence outputted as an image through the display and acquiring information for artificial intelligence from the image frame for artificial intelligence, an artificial intelligence unit for analyzing the image captured by the camera to classify the objects in the image and create control commands, and a processor for processing the information for artificial intelligence acquired from the unit for identifying an image for artificial intelligence and the control commands created by the artificial intelligence unit.

14. The system of claim 13, wherein the image frame for artificial intelligence comprises a crash warning image, and the artificial intelligence unit considers the area with the crash warning image in the image captured by the camera as a fixed object and performs an image analysis when the unit for identifying an image for artificial intelligence identifies the crash warning image.

15. The system of claim 13, wherein the vehicle with artificial intelligence further comprises a distance sensor, and the artificial intelligence unit comprises a deep-learning algorithm to have input of the image captured by the camera, values measured by the distance sensor, and the information for artificial intelligence examined by the unit for identifying an image for artificial intelligence through its input nodes.

16. The system of claim 13, wherein the vehicle with artificial intelligence comprises a communication unit for sending its identification information to the image processing device through wireless communication.

* * * * *